United States Patent Office 3,490,893
Patented Jan. 20, 1970

3,490,893
3H-1,2,3-BENZODITHIAZOLE-2-OXIDES AS HERBICIDES
James L. Ahle, Shawnee, and William C. Doyle, Jr., Leawood, Kans., assignors to Gulf Research & Development Company, Pittsburgh, Pa., a corporation of Delaware
No Drawing. Filed Nov. 19, 1968, Ser. No. 777,159
Int. Cl. A01n 9/12
U.S. Cl. 71—91     3 Claims

ABSTRACT OF THE DISCLOSURE

A group of 3H-1,2,3-benzodithiazole-2-oxides, particularly 6 - chloro - 4,7 - dimethyl - 3H - 1,2,3 - benzodithiazole-2-oxide are useful for combating weeds in small grains. The oxides are prepared by hydrolysis of the corresponding 1,3,2-benzothiazathiolium chlorides.

DESCRIPTION OF INVENTION

Although there now exist many herbicides which are effective against broad-leaved weeds in crops such as corn and wheat, the problem of controlling certain weeds, particularly pigweed, remains a serious one. The reason for the existence of the problem appears to be related to the genetic characteristics of the weeds. The individual plants vary a great deal in hereditary characteristics, including resistance to drought, wet weather, shading, herbicides and other environmental factors. It seems that no matter how severe the environmental conditions, a few pigweed plants survive and re-seed the area with their mixed-breed offspring. Continued use of one specific herbicide tends to favor growth of a strain which possesses resistance to this specific substance, making it necessary to change herbicides in order to maintain control. Since the crop plants are usually the result of years of selective breeding they do not possess the varied heredity with which to resist herbicides. Therefore only a small number of compounds possess sufficient selectivity so they may be used without excessive injury to crops. It is a frequently observed fact that an accidental overdose of herbicide more often produces a 100 percent kill of the crop than of the weeds. There is a long-existing need for a greater number of selective herbicides which may be used with relative safety to grain crops.

We have discovered that a novel class of 3H-1,2,3-benzodithiazole-2-oxides are effective as selective herbicides, particularly against some common broadleaf weeds in crops such as wheat, barley, oats and corn. Briefly, we combat certain undesired plant growth by applying post-emergently to the plant a herbicidally effective amount of a substance having the generic structural formula

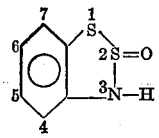

in which substituents at positions 4-, 5-, 6- and 7- are selected from the following groups:

at position 4-; H—, Cl—, $CH_3$—, $CF_3$—, F— and $CH_3O$—
at position 5-; H—, Cl—, $CH_3$— and $CF_3$—
at position 6-; H—, Cl—, $CH_3O$— and $CH_3S$—
at position 7-; H—, Cl— and $CH_3$—

The compounds are prepared by hydrolysis of the corresponding 1,3,2-benzothiazathiolium chlorides, as discussed below.

PREPARATION OF 1,3,2-BENZOTHIAZATHIOLIUM CHLORIDES (I)

Three general methods may be used to prepare the intermediate benzothiazathiolium chlorides: Method A is the original procedure of Herz, as recently described in more detail by Huestis, Walsh and Hahn (2). One mole of the aniline in glacial acetic acid is treated with seven moles of sulfur monochloride. Method B is a modification of Method A in that the aniline is first converted to the hydrochloride and the molar excess of sulfur monochloride is only 3.5 fold. Under these conditions, the elemental sulfur by-product is no longer soluble in the reaction mixture, but can easily be removed following the hydrolysis step. Method C, the novel procedure of Huestis, Walsh and Hahn (2), uses the reaction of ortho-aminobenzenethiol hydrochlorides with thionyl chloride. Since the reaction of sulfur monochloride with anilines unsubstituted in the para position invariably results in chlorination at that position, it was necessary to use Method C for those 3H-1,2,3-benzodithiazole-2- oxides having hydrogen at the 6 position.

The choice between the use of an aniline or its hydrochloride is not entirely arbitrary. With 2,5-dimethylaniline and o-trifluoromethyl aniline, Method A produces only tars and non-hydrolyzable solids, while Method B gives the desired products in good yields.

PREPARATION OF 3-H-1,2,3-BENZODITHIAZOLE 2-OXIDES (II)

An aqueous slurry of the benzothiazathiolium chloride is stirred at room temperature for about one hour. The solid is collected, dissolved in methanol and treated with activated charcoal. Addition of water to the filtered solution gives the product as a colorless, or pale violet crystalline solid. Further purification by recrystallization is impractical, as even brief heating in any of a variety of solvents cause extensive decomposition with evolution of sulfur dioxide.

REFERENCES TO SYNTHESIS PROCEDURES (1) Herz, R., (to Cassella & Co.), German Patent 360,690 (Oct. 6, 1922); (2) Heustis, L., Walsh, M., Hahn, N., J. Org. Chem. 30, 2763 (1965) and references therein; (3) Warburton, W. K., Chem. Rev. 57, 1011 (1957).

SPECIFIC COMPOUNDS

Specific 3H-1,2,3-benzodithiazole 2-oxides which have been prepared and the methods of preparation, melting points and analytical data are shown in Table I.

EXAMPLE 1

6-chloro-4,7-dimethyl-3H-1,2,3 - benzodithiazole 2-oxide (compound No. 8 in Table 1) was employed as a post-emergence herbicide at 2 lb., 1 lb., and ½ lb. per acre ac-

TABLE I.—3H-1,2,3-BENZODITHIAZOLE 2-OXIDES

| Cpd. No. | Substituents | | | | Method | M.P. (°C.) | Analysis, percent | | | | | |
|---|---|---|---|---|---|---|---|---|---|---|---|---|
| | | | | | | | Carbon | | Hydrogen | | Nitrogen | |
| | 4 | 5 | 6 | 7 | | | Calcd. | Found | Calcd. | Found | Calcd. | Found |
| 1 | H | H | H | H | C | [1] 124-5 | | | | | | |
| 2 | H | H | Cl [2] | H | A | [1] 114-15 | | | | | | |
| 3 | Cl | H | Cl [2] | H | A | [1] 110-15 | | | | | | |
| 4 | Cl | H | Cl [3] | Cl | A | 132-5 | 26.24 | 27.67 | 0.73 | 0.65 | 5.10 | 5.27 |
| 5 | H | Cl | Cl [3] | Cl | A | 131-3 | 26.24 | 26.82 | 0.73 | 0.88 | 5.10 | 5.45 |
| 6 | $CH_3$ | H | Cl [2] | H | A | 126-7 | 38.27 | 38.77 | 2.74 | 3.02 | 6.38 | 6.53 |
| 7 | $CH_3$ | $CH_3$ | Cl [3] | H | A | 139-40 | 41.11 | 41.70 | 3.45 | 3.59 | 5.99 | 5.76 |
| 8 | $CH_3$ | H | Cl [3] | $CH_3$ | B | 123-5 | 41.11 | 41.76 | 3.45 | 3.23 | 5.99 | 6.15 |
| 9 | $CF_3$ | H | Cl [3] | H | B | 133-4 | 30.72 | 30.12 | 1.11 | 1.50 | 5.12 | 5.28 |
| 10 | H | $CF_3$ | H | H | C | 124-7 | 35.14 | 36.11 | 1.69 | 2.03 | 5.86 | 6.21 |
| 11 | $OCH_3$ | H | $OCH_3$ | Cl | B | 140-3 | 36.16 | 35.61 | 3.03 | 3.04 | 5.27 | 5.48 |
| 12 | H | H | $SCH_3$ | H | B | 121 | 38.68 | 39.23 | 3.25 | 3.59 | 6.45 | 6.86 |
| 13 | F | H | Cl [3] | H | A | 107-8 | 32.22 | 31.82 | 1.35 | 1.74 | 6.26 | 6.81 |
| 14 | H | Cl | H | H | C | 129-31 | 35.03 | 38.40 | 1.96 | 2.28 | 6.81 | 7.53 |
| 15 | Cl | Cl | Cl | H | A | 119 | 26.24 | 23.47 | 0.73 | 1.54 | 5.10 | 4.83 |
| 16 | $CH_3$ | Cl | Cl | H | A | 121-3 | 32.95 | 34.68 | 2.37 | 2.01 | 5.49 | 6.14 |
| 17 | $OCH_3$ | H | $OCH_3$ | H | B | 135-40 | 41.54 | 37.93 | 3.92 | 3.28 | 6.06 | 5.61 |

[1] Reference 2.  [2] This chlorine was present in the starting aniline.  [3] This chlorine was introduced duting the synthesis.

USE OF THE COMPOUNDS AS HERBICIDES

Post-emergence herbicidal activity and selectivity of the compounds listed in Table I were evaluated according to the following procedure:

(1) Post-emergence activity

An aqueous dispersion of each active compound was prepared by combining 0.4 gram of the compound with about 4 ml. of a solvent-emulsifier mixture (3 parts of a commercial polyoxyethylated vegetable oil emulsifier, one part xylene, one part kerosene) and then adding water, with stirring, to a final volume of 40 ml.

The species of plants on which each compound was to be tested were planted in four-inch pots in a greenhouse. Ten to eighteen days after emergence of the plants, three pots of each species were sprayed with an aqueous dispersion of the active compound prepared as described above, at a rate of 5 lb. of active compound per acre and at a spray volume of 60 gallons per acre. Approximately one week after the spray application the plants were observed and the results rated according to the following schedule:

C=Chlorosis (bleaching)    0=No effect
N=Necrosis    1=Slight effect
G=Growth inhibition    2=Moderate effect
F=Formative effect    3=Severe effect
(abnormal form of growth)    4=Maximum effect
(all plants died)

Results are tabulated below in Table II.

cording to the procedure outlined above at all three rates on all of the following plants: green foxtail, wild mustard, pigweed, wild buckwheat, lambsquarters, corn cockle, morning glory, wheat, barley, oats and corn. At all three application rates complete control was obtained on wild mustard and pigweed with only slight effect on barley and oats. Below 2 lb. per acre the effect on wheat and corn was also only slight. At 2 lb. per acre complete control was also obtained on lambsquarters and morning glory.

In order to obtain uniform application of a small amount of active substance over a large area, the herbicide is preferably applied as a dispersion in a diluent such as water, obtained with the aid of a surface active agent. For shipping and storage prior to dilution and application the herbicides are formulated in the customary manner with a surface active agent and a relatively small amount of a solvent, oil or inert solid as a diluent. Both emulsifiable concentrates and wettable powders are useful and effective formulations.

EXAMPLE 2

4,6,7-trichloro - 3H - 1,2,3 - benzodithiazole 2-oxide was employed in combination with a surface active agent and a diluent as in Example 1. The test species of plants included lambsquarters, pigweed, kochia, green foxtail, sugar beets and wheat. Complete control was obtained on pigweed at application rates as low as ½ lb. per acre. At 1 lb. per acre injury to sugar beets and wheat was only

TABLE II.—POST EMERGENCE EFFECTS

| Cpd. No. | Millet | Soybean | Cotton | Alfalfa | Oats | Corn | Flax | Radish | Sugar beets | Wheat | Grain sorghum | Tomato |
|---|---|---|---|---|---|---|---|---|---|---|---|---|
| 1 | 4 | 4 | 4 | 2 | 2 | 2 | 2 | 1 | 4 | 1 | 3 | 4 |
| 2 | 1 | 2 | 1 | 2 | 1 | 1 | 1 | 2 | 4 | 1 | 1 | 1 |
| 3 | 2 | 2 | 4 | 4 | 1 | 1 | 2 | 2 | 4 | 2 | 1 | 3 |
| 4 | 4 | 2 | 4 | 3 | 1 | 1 | 2 | 2 | 4 | 1 | 1 | 2 |
| 5 | 2 | 1 | 3 | 3 | 0 | 1 | 2 | 3 | 4 | 2 | 1 | 4 |
| 6 | 3 | 2 | 4 | 4 | 1 | 1 | 2 | 1 | 3 | 1 | 1 | 2 |
| 7 | 1 | 1 | 3 | 2 | 1 | 1 | 3 | 3 | 4 | 2 | 3 | 3 |
| 8 | 4 | 4 | 3 | 2 | 2 | 1 | 1 | 4 | 4 | 1 | 1 | 4 |
| 9 | 3 | 4 | 4 | 4 | 1 | 1 | 4 | 4 | 4 | 3 | 2 | 4 |
| 10 | 4 | 2 | 4 | 2 | 1 | 1 | 2 | 2 | 4 | 1 | 1 | 4 |
| 11 | 2 | 1 | 2 | 1 | 1 | 1 | 2 | 1 | 4 | 0 | 1 | 1 |
| 12 | 3 | 1 | 1 | 2 | 4 | 1 | 1 | 1 | 2 | 1 | 1 | 4 |
| 13 | 1 | 3 | 4 | 3 | 1 | 1 | 2 | 2 | 4 | 1 | 0 | 2 |
| 14 | 2 | 2 | 3 | 2 | 1 | 1 | 4 | 1 | 3 | 1 | 1 | 4 |
| 15 | 2 | 3 | 4 | 4 | 1 | 1 | 4 | 2 | 4 | 1 | 2 | 3 |
| 16 | 3 | 4 | 3 | 4 | 1 | 1 | 2 | 2 | 4 | 1 | 1 | 1 |
| 17 | 1 | 1 | 1 | 1 | 0 | 0 | 1 | 1 | 1 | 1 | 0 | 1 |

Use of the novel compounds to combat undesired plant growth is further illustrated by the following examples.

slight. At ½ lb. per acre there was no discernible effect on either sugar beets or wheat.

We claim:
1. The method of combating weeds by applying post emergently to the weeds a herbicidally effective amount of a substance having the structural formula

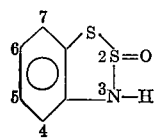

in which the substituents at positions 4—, 5—, 6— and 7— are selected from the following groups
- at position 4—; H—, Cl—, CH$_3$—, CF$_3$—, F— and CH$_3$O—
- at position 5—; H—, Cl—, CH$_3$— and CF$_3$—
- at position 6—; H—, Cl—, CH$_3$O— and CH$_3$S—
- at position 7—; H—, Cl— and CH$_3$—

2. The method of combating weeds by applying post emergently to the weeds a herbicidally effective amount of 6-chloro-4,7-dimethyl-3H-1,2,3-benzodithiazole 2 - oxide in combination with a surface active agent and a diluent.

3. The method of combating weeds by applying post emergently to the weeds a heribicidally effective amount of 4,6,7-trichloro-3H-1,2,3-benzodithiazole 2-oxide in combination with a surface active agent and a diluent.

References Cited

UNITED STATES PATENTS

| | | | |
|---|---|---|---|
| 1,637,023 | 7/1927 | Herz | 260—132 |
| 1,699,432 | 1/1929 | Herz | 260—304 |
| 3,066,149 | 11/1962 | Slezak et al. | 71—90 |
| 3,080,364 | 3/1963 | Schroeder | 71—91 |
| 3,279,909 | 10/1966 | Daams et al. | 71—90 |
| 3,361,752 | 1/1968 | D'Amico | 71—90 |

OTHER REFERENCES

Warburton, The Herz Reaction, pp. 1011–1020, Chem. Rev. 57 (1957).

Huestis et al., The Herz Reaction, pp. 2763–66, J. Org. Chem., 30 (1965).

LEWIS GOTTS, Primary Examiner

G. HOLLRAH, Assistant Examiner